United States Patent [19]

Priest et al.

[11] Patent Number: 5,046,163

[45] Date of Patent: Sep. 3, 1991

[54] HAND HELD INTERNALLY ILLUMINATED VIDEO READING AID

[76] Inventors: Ronald A. Priest, 8046 Bayhaven Dr., Seminole, Fla. 34646; Orion T. Ayer, Jr., 200 Driftwood La. SE., St. Petersburg, Fla. 33705

[21] Appl. No.: 494,653

[22] Filed: Mar. 16, 1990

[51] Int. Cl.$^5$ .............................................. H04N 7/00
[52] U.S. Cl. ..................................... 358/94; 358/229; 358/93
[58] Field of Search ................... 358/93, 94, 229, 249, 358/185, 473, 494, 906, 252; 382/59

[56] References Cited

U.S. PATENT DOCUMENTS

| | | | |
|---|---|---|---|
| 3,993,865 | 11/1976 | Browne | 358/494 |
| 4,115,813 | 9/1978 | Mikami | 358/229 |
| 4,136,361 | 1/1979 | Doan | 358/229 |
| 4,727,416 | 2/1988 | Cooper | 358/229 |
| 4,928,170 | 5/1990 | Soloveychik | 358/93 |

Primary Examiner—James J. Groody
Assistant Examiner—Sherrie Hsia
Attorney, Agent, or Firm—Joseph C. Mason, Jr.; Ronald E. Smith

[57] ABSTRACT

A light in weight, hand held device that enables people having low vision capabilities to read small alphanumeric characters. A pin hole lens camera having a long, narrow profile is housed in a housing of the same configuration. A small opening is formed in the leading end of the housing in open communication with the pin hole lens to admit light into the lens. A low intensity light source is positioned immediately adjacent that opening. Roller members are transversely mounted on the leading end of the housing to facilitate displacement of the housing in lateral directions of the type needed to read printed matter. The output of the camera is conductively coupled to a remote monitor and the alphanumeric characters transmitted to the monitor are up to sixty times larger than the original characters. The housing may be adjustably mounted to a support plate so that the user may select the size of the field of view desired, and a rotatably mounted wheel enables adjustment of the focus of the pin hole lens.

7 Claims, 5 Drawing Sheets

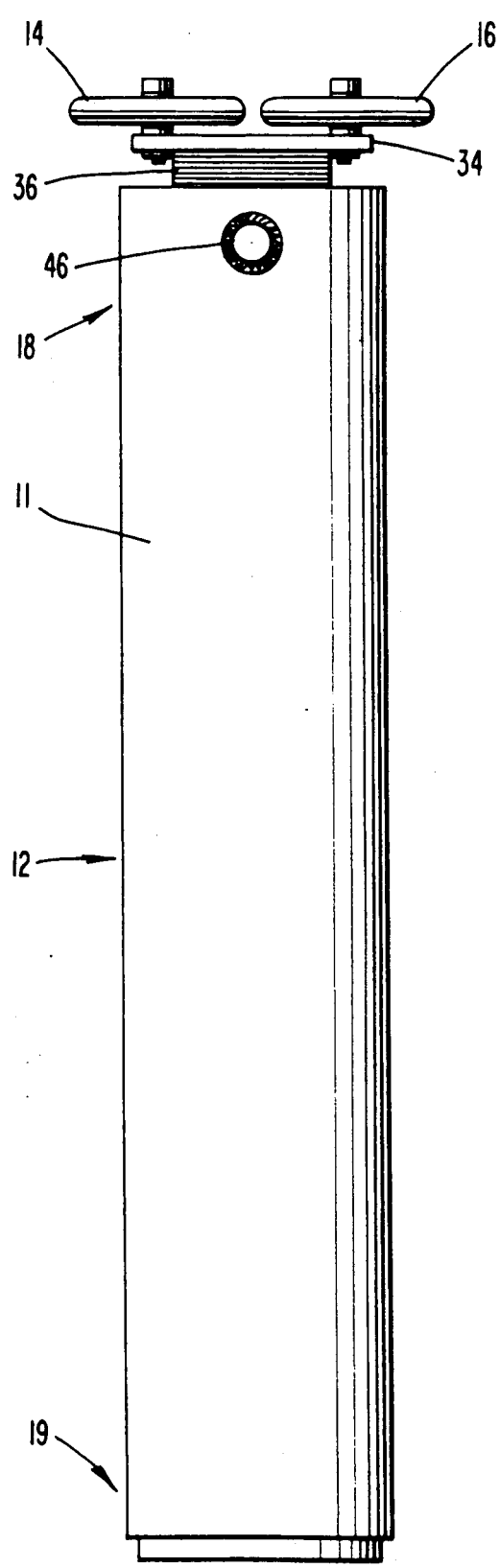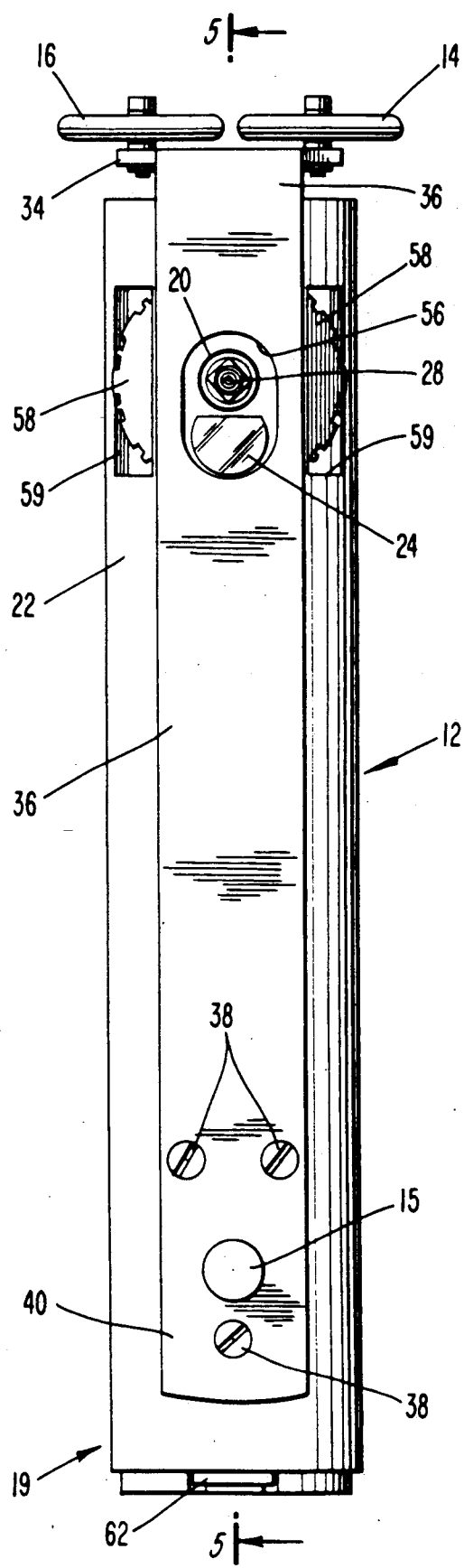

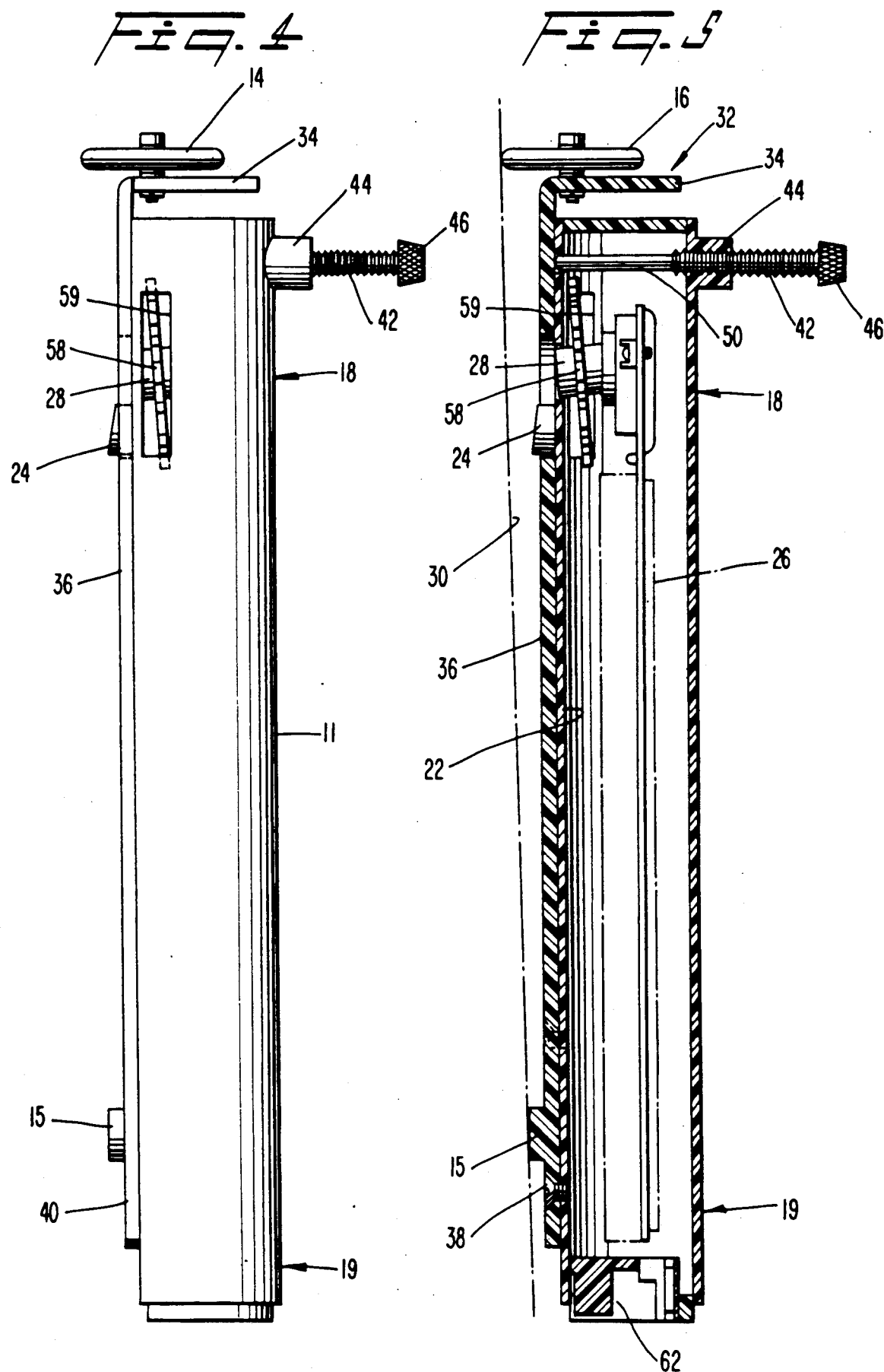

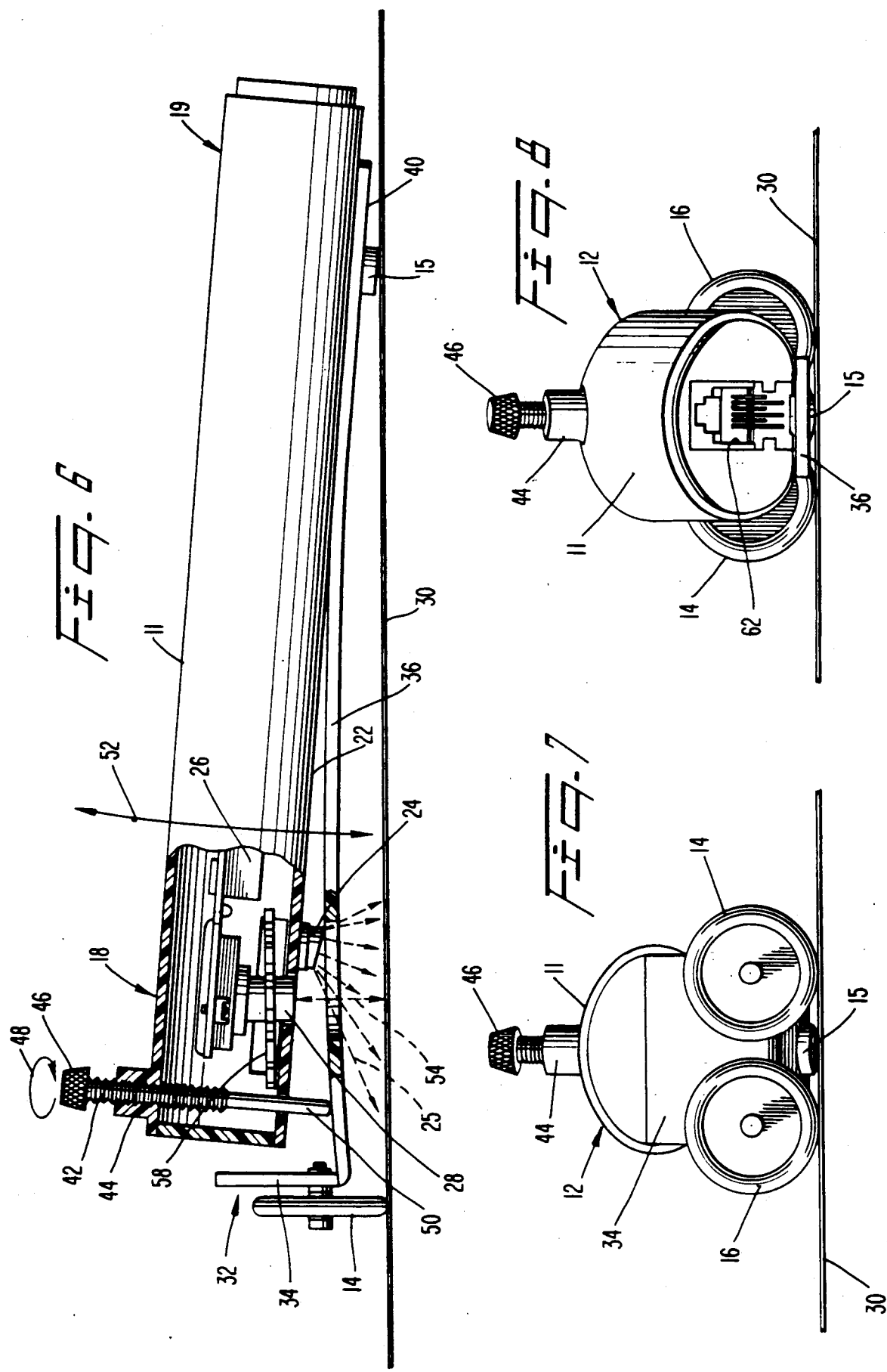

HAND HELD INTERNALLY ILLUMINATED VIDEO READING AID

TECHNICAL FIELD

This invention relates, generally, to devices that enable the reading of printed matter by people having low vision capabilities. More particularly, it relates to a hand held unit that transmits printed matter onto a television screen or other monitor where it is displayed in greatly enlarged form for easy reading.

BACKGROUND ART

People having low vision find it difficult or impossible to read small printed matter of the type that appears on bills, prescriptions, newspapers and the like. Thus, they often find it necessary to ask other people to read their mail for them. Many low vision people have to walk to a neighbor's house, for example, to request reading of a telephone bill.

Where the vision loss is not great, a simple magnifying glass may render small print readable However, the common magnifying glass has insufficient magnification to be of value to large numbers of low vision people.

One method developed by inventors to provide greater magnification or enlargement of printed matter includes the use of television sets. A small hand held camera is conductively coupled to a television set or other monitor and the low vision person aims the camera lens at the words or numbers sought to be read. The printed matter is transmitted by the camera onto the screen where it is enlarged up to sixty times depending upon the size of the screen. The result is a satisfactory enlargement that solves the problem for the majority of low vision people.

Examples of low vision reading aids of this type are shown in U.S. Pat. Nos. 4,136,361 to Doan (a hand held, pen light-type device), 3,993,865 to Browne et. al., 4,115,813 to Mikami, 3,816,646 to Cinque, 3,819,855 to Rush L et. al., and German patent 200 844.

Although these earlier devices have great utility, they still have several important limitations. For example, the units rely upon a bright light source to illuminate the printed matter, and the resulting glare prevents many low vision people from being able to read the enlarged letters and numerals on the screen.

Moreover, since in prior art devices the camera lens is spaced more than an inch away from the printed matter, skewing becomes a problem, i.e., the unit must be held at right angles to the printed matter to avoid distortion of the alphanumeric characters on the monitor.

Many of the earlier devices are also physically unstable when in use or in storage, i.e., they are knocked over easily.

However, the prior art, taken as a whole, neither teaches nor suggests how a light-in-weight device free from skewing problems, glare problems, and the like could be provided.

DISCLOSURE OF INVENTION

A glare free, light-in-weight, economically designed hand held unit having a stable in-use and storage position is now provided. A light emitting diode (LED) that provides a glare-free, very low intensity red light is positioned near the lens opening of a pin hole lens camera to provide all of the illumination needed for the unit. The unit includes a narrow, elongate housing having a pair of rotatably mounted, transversely disposed wheel members forwardly of its leading end that enable rolling of the unit in lateral displacement across a page, thus tracking a line of printed matter. The pin hole lens camera is positioned within the housing near the leading end. The wheels space the lens opening only slightly above the printed page, and the illumination of the page by the LED is of such low intensity that no glare is thereby created. A first adjustment means controls the spacing between the lens and the page, and a second adjustment means controls the focus of the lens. Moreover, the construction of the housing is such that the unit cannot be knocked over when in its storage position.

An important object of this invention is to provide a low vision reading aid that weighs less than half that of the units of the prior art.

Another important object is to provide a glare-free low vision aid.

Still another object is to provide a low vision aid that may be held in various positions for the comfort of the user thereof without skewing or distorting the printed matter transmitted to a television screen.

Many other objects and advantages will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 2 is a top plan view of the novel housing of the low vision reading aid;

FIG. 3 is a bottom plan view thereof;

FIG. 4 is a side elevational view thereof;

FIG. 5 is a longitudinal sectional view taken along line 5—5 in FIG. 3;

FIG. 6 is a partially broken away side elevational view of said housing;

FIG. 7 is a front end view thereof;

FIG. 8 is a back end view thereof; and

BEST MODES FOR CARRYING OUT THE INVENTION

Figure 1:
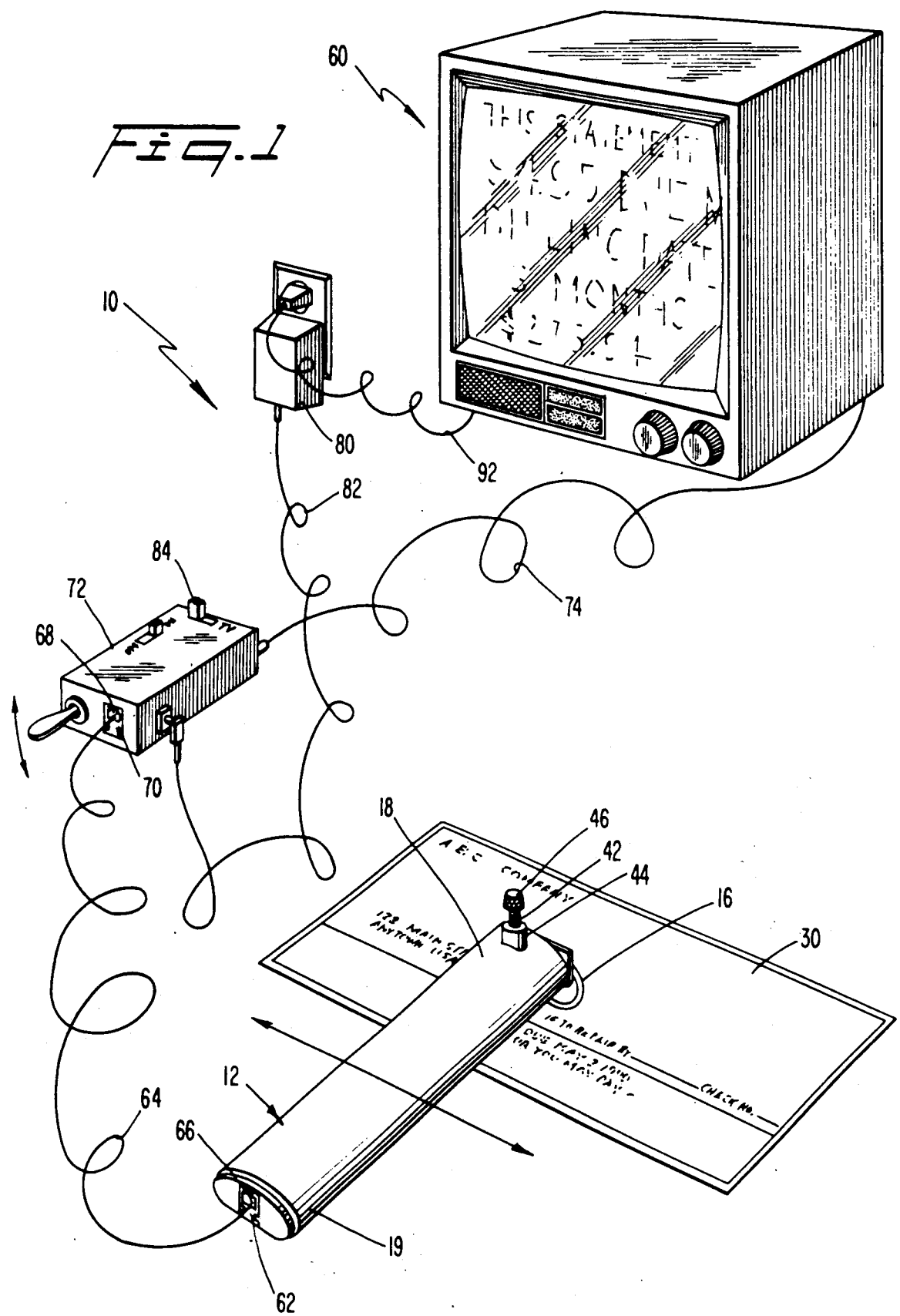
FIG. 1 is a perspective view of a first embodiment of the invention, including its environment.

Referring now to FIG. 1, it will there be seen that an illustrative embodiment of the invention and its environment is denoted as a whole by the reference numeral 10.

The device, to be known commercially as the EZ Reader, includes an elongate, narrow housing 12. As shown in FIG. 1, when device 10 is in use, housing 12 is in a stable position, i.e., its low profile insures that it cannot be knocked over. It is preferably stored in the same stable position.

A pair of transversely disposed, rotatably mounted wheel members 14, 16, best shown in FIGS. 2, 3 and other Figs., are mounted forwardly of the leading end 18 of the housing 12 as shown. The respective axes of rotation and wheel diameters are positioned and selected, respectively, to lift leading end 18 of housing 12 above the plane of the paper 30 upon which the printed matter to be read is imprinted, as perhaps best understood in connection with FIG. 6.

Those skilled in the art of machine design will note that a transversely disposed skid means, not shown, could replace the wheel members and satisfactorily perform the function of spacing the leading end of the housing above the plane of the paper. Moreover, a single wheel could be employed, or more than two wheels. Such a skid means 15 is employed at the trailing end 19 of the device, as perhaps best shown in FIG. 6.

As best shown in FIG. 3, a small opening 20 is formed near the leading end of housing bottom wall 22, and a low intensity light source, preferably an LED 24, is fixedly secured to said bottom wall 22 immediately adjacent said opening 20.

An elongate, narrow camera means 26 (FIG. 6) is disposed within said housing 12 and is protected thereby. The camera 26 has a pin hole lens 28 positioned in registration with opening 20 so that light entering said opening impinges upon a charge coupled device (CCD) within said camera 26.

The low intensity light 25 provided by LED 24 provides ample light for operation of camera 26, but the intensity thereof is insufficient to cause a glare on paper 30 or to otherwise affect the vision of the user of the EZ Reader.

As best shown in FIGS. 3-6, housing 12 is mounted atop an elongate, flexible support plate 32 having an upstanding leading end 34 and an elongate, flat horizontal or longitudinally extending main part 36. Wheels 14, 16 are rotatably mounted to said leading end 34 as shown. A plurality of screws, collectively denoted 38 (FIG. 3), secure the trailing end 40 of support plate part 36 to housing 12. Importantly, flexible support plate 32 is not otherwise attached to housing 12.

As best understood in connection with FIGS. 5 and 6, the angular disposition between support plate part 36 and housing 12 and hence the angular disposition between pin hole lens 28 and paper 30 is controlled by an elongate screw member 42 that screw threadedly engages boss member 44 that is integrally formed in the top wall 11 of housing 12. Screw 42 has a knurled head 46 that facilitates its turning, such turning being indicated by a single-headed directional arrow 48 in FIG. 6. Leading end 50 of screw 42 bears against support plate part 36 and, accordingly, rotation of screw 42 effects raising and lowering of housing 12 and hence of pin hole lens 28 relative to paper 30 as denoted by the solid double-headed reference arrow 52 in FIG. 6 and as denoted by the broken line double-headed reference arrow 54 in said FIG. 6.

Full retraction of screw 42 is depicted in FIGS. 4 and 5. There it will be seen that such full retraction brings bottom wall 22 of housing 12 into overlying relation to support plate part 36, i.e., housing 12 and support plate part 36 are disposed at a common angle and pin hole lens 28 is closely spaced to paper 30. This orientation of parts reduces the field of view of pin hole lens 28 and provides increased magnification of the alphanumeric characters being scanned. Conversely, when screw 42 is advanced as shown in FIG. 6, the field of view is enlarged but the magnification is decreased. Thus, it should be understood that this angular adjustability feature is provided to enable consumers to adjust the field of view and magnification to their personal liking, but the device could be provided without such adjustability feature. In a non-adjustable embodiment, wheels 14, 16 would be mounted directly to the leading end 18 of housing 12 and support plate 32, boss 44 and screw 42 would be eliminated.

An oblong opening 56 (FIG. 3) is formed in support plate part 36 so that said part 36 does not block pin hole lens 28 and LED 24.

The focus of lens 28 may be adjusted by rotating wheel 58; a suitable opening 59 (FIGS. 3 and 4) is formed in housing 12 as best shown in FIGS. 3 and 4 to enable the user of device 12 to easily rotate said wheel 58 to adjust the focus as desired. If it is desired to view on monitor 60 (FIG. 1) an object that is ten feet away, e.g., the user simply aims pin hole lens 28 toward the object and rotates wheel 58 until lens 28 is set at its infinity focus, and the remote object will appear in focus on the screen of monitor 60. Clearly, this invention has utility beyond the illustrated purpose.

In a first embodiment, a telephone type jack 62 (FIGS. 1 and 8) is positioned in the trailing end 19 of housing 12; the video signals emitted by the camera output are fed to said jack 62. An elongate electrical cord 64 (FIG. 1) of suitable design has a complemental coupler 66 at a first end thereof and is releasably coupled to said jack 62 in the well known way. A similar coupler 68 is carried at the second end of cord 64 and releasably engages a complemental jack 70 formed in modulator box 72 which is conductively coupled by suitable means 74 to a television set or other suitable monitor 60.

Figure 9:
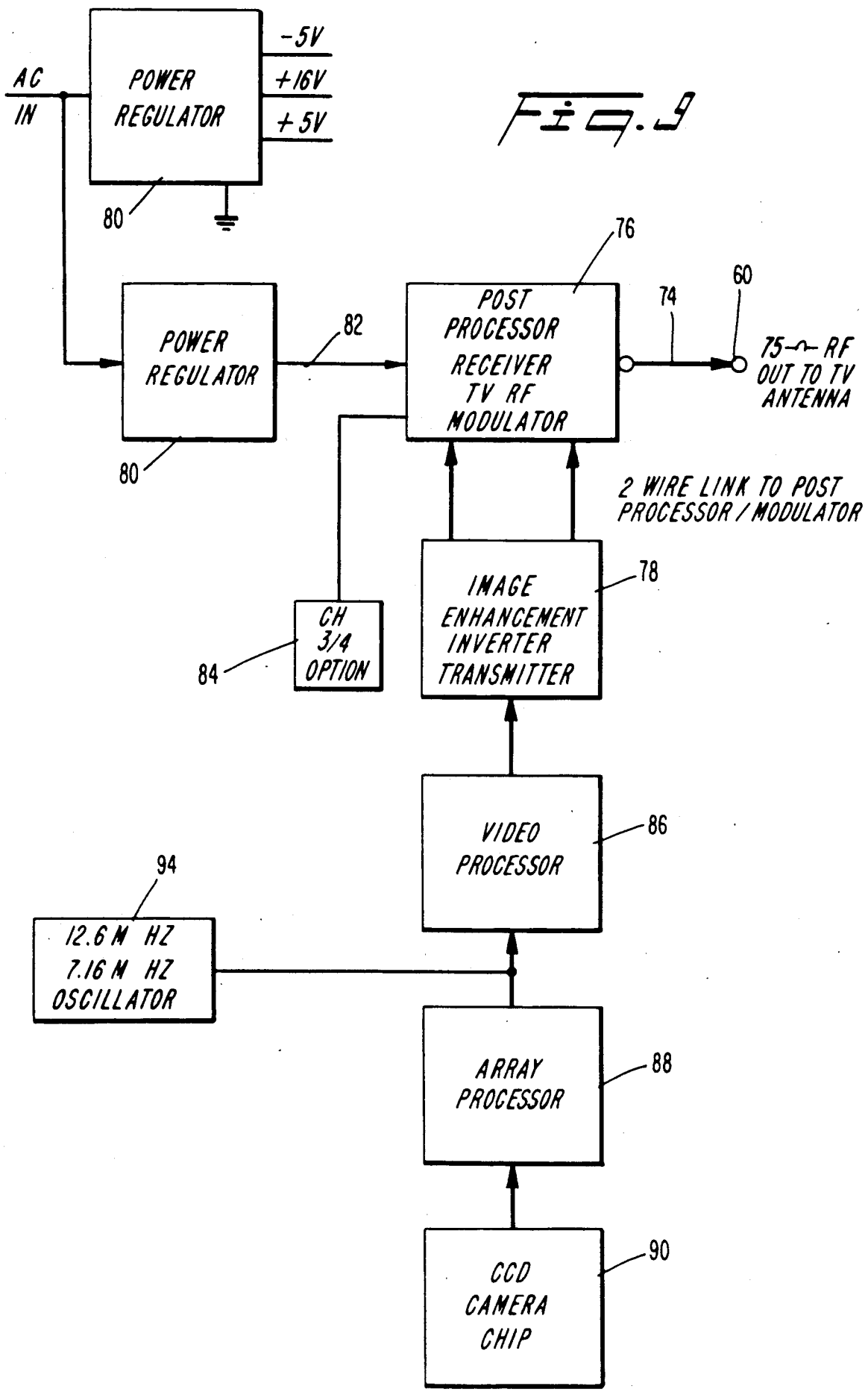
FIG. 9 is a block diagram of the electronic aspects of the invention.

As shown in FIG. 9, the modulator 76 within box 72 applies the video signals transmitted by camera 26 to the input of monitor 60. An inverter 78 is also positioned within modulator box 72 to provide white letters on a dark background on the monitor screen to further enhance the easy readability of the alphanumeric characters displayed on the monitor 60. Additional readability is derived within the modulator 76 through electronically limiting the video grey scale so as to produce clear demarcation between the background and the written matter to be viewed.

As shown in FIGS. 1 and 9, a rectifier and step down transformer 80 supplies low voltage direct current to modulator 72 through line 82. Switch 84 permits the user to select VHF channel three or four, dependent upon which of said channels is not in use by a local public broadcaster. As shown in FIG. 9, a suitable video processor 86 and array processor 88 are coupled to charge coupled device 96 to complete the electronic circuitry of this invention.

Monitor 60 is conventionally supplied with power through cord 92 (FIG. 1).

Depending upon the size of monitor 60, alphanumeric characters are enlarged sixty times, as indicated in FIG. 1.

In a second embodiment, not shown, cord 74 is eliminated and the camera video output is transmitted to monitor 60 at a suitable ultra high frequency by a suitable transmitter housed in modulator box 72. The transmitter includes oscillator 94 shown in FIG. 9.

Advantageously, since pin hole lens 28 is positioned close to paper 30, large amounts of skewing of housing 12 can be tolerated. Perhaps more importantly, the housing 12 and its contents weigh only about three ounces, far below the weight of earlier reading aids.

The pin hole lens camera 26 is available from Lionel Trains, Incorporated, and may be available from other sources as well.

This invention is new and useful. Moreover, it was not obvious to those of ordinary skill in the art at the time it was made, in view of the prior art, considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described,

What is claimed is:

1. A low vision reading aid, comprising:

an elongate, narrow housing having a leading end and a trailing end;

an elongate narrow camera disposed within said housing;

said camera having a pin hole lens;

a small opening being formed in said housing near said leading end thereof;

said small opening being in registration with said pin hole lens to admit light thereinto;

a low intensity light source disposed adjacent said small opening;

said light source providing continuous illumination when activated and being mounted to said housing in closely spaced relation to said small opening;

an elongate flexible support plate having a leading end and a trailing end;

said support plate being positioned in underlying relation to said housing;

the trailing end only of said support plate being secured to the trailing end of said housing;

a transversely disposed wheel means that facilities lateral displacement of said housing being rotatably mounted to a leading end of said support plate;

said housing and said support plate having a plurality of positions of functional adjustment therebetween, including a first position where said housing and support plate abut one another along their respective extents and including plural positions of angular adjustment where the respective leading ends only of said housing and support plate are vertically spaced apart from one another;

an opening formed in said support plate leading end, said opening having a size sufficient to accommodate said light source when said housing and support plate abut one another along their respective extents and said opening having a size also sufficient to admit light into the small opening in the housing;

angular adjustment means for selectively adjusting the angular orientation between the housing and the support plate to thereby adjust the field of view of said camera; and means for transmitting video data from said camera to a remote monitor.

2. The reading said of claim 1, wherein said wheel means includes a pair of transversely disposed, laterally spaced apart wheel members.

3. The reading aid of claim 1, wherein said angular adjustment means includes a boss member formed in said housing adjacent its leading end and a screw member disposed in screw threaded relation to said boss member, said screw member having a leading end disposed in abutting relation to said support plate so that advancement of said screw member increases the angular orientation between said housing and said support plate to increase the field of view of said camera, and so that retraction of said screw member decreases said angular orientation and decreases said field of view.

4. The reading aid of claim 3, further comprising means for adjusting the focus of said pin hole lens.

5. The reading aid of claim 4, wherein said means for adjusting said focus includes a wheel member rotatably mounted to said pin hole lens, said housing having an opening formed therein to provide access to said wheel member.

6. The reading aid of claim 1, further comprising a modulator means and a telephone jack formed in said housing to facilitate electrical connection of said housing to said modulator means.

7. The reading aid of claim 6, wherein said means for transmitting video data from said camera to said remote monitor includes a radio frequency transmitting means.

* * * * *